(12) United States Patent
Wu

(10) Patent No.: US 10,710,658 B2
(45) Date of Patent: Jul. 14, 2020

(54) APPARATUS WITH HIGH SECURITY FOR BICYCLE

(71) Applicant: MICROPROGRAM INFORMATION CO., LTD., Taichung (TW)

(72) Inventor: Teng Yan Wu, Taichung (TW)

(73) Assignee: Microprogram Information Co., Ltd., Taichung (TW)

( * ) Notice: Subject to any disclaimer, the term of this patent is extended or adjusted under 35 U.S.C. 154(b) by 15 days.

(21) Appl. No.: 16/133,181

(22) Filed: Sep. 17, 2018

(65) Prior Publication Data

US 2019/0168834 A1 Jun. 6, 2019

(30) Foreign Application Priority Data

Dec. 5, 2017 (TW) .............................. 106142488 A

(51) Int. Cl.
*B62H 5/00* (2006.01)
*B62J 9/00* (2020.01)
*G06Q 50/30* (2012.01)
*B62H 3/00* (2006.01)

(52) U.S. Cl.
CPC ................ *B62H 5/001* (2013.01); *B62J 9/00* (2013.01); *G06Q 50/30* (2013.01); *B62H 2003/005* (2013.01)

(58) Field of Classification Search
CPC ...... B62H 5/001; B62H 2003/005; B62J 9/00; B62J 9/02; G06Q 50/30; E05B 71/00; E05B 65/006; E05B 65/0075; E05B 65/52; E05B 65/523; E05B 65/5284
USPC ..................... 70/63, 233–236, 158–173, 277, 70/278.1–278.3, 278.7, 279.1, 280–282, 70/283.1; 292/144; 109/47, 58, 59 R, 109/64, 67, 68
See application file for complete search history.

(56) References Cited

U.S. PATENT DOCUMENTS

| 2,146,968 | A | * | 2/1939 | Macagno | ............... | B60K 15/05 |
| | | | | | | 292/144 |
| 2,491,791 | A | * | 12/1949 | Allen | ..................... | B60K 15/05 |
| | | | | | | 280/850 |
| 4,012,930 | A | * | 3/1977 | Benson | .................. | B62H 5/003 |
| | | | | | | 70/234 |
| 4,030,322 | A | * | 6/1977 | Pettit | ...................... | B60K 15/05 |
| | | | | | | 70/159 |
| 4,325,531 | A | * | 4/1982 | Omholt | ..................... | B62J 9/00 |
| | | | | | | 248/553 |
| 4,577,477 | A | * | 3/1986 | Olshausen | ............... | B62J 11/00 |
| | | | | | | 70/58 |
| 6,098,433 | A | * | 8/2000 | Maniaci | .............. | E05B 47/0002 |
| | | | | | | 292/144 |
| 7,874,972 | B2 | * | 1/2011 | Hayasaka | ................. | B04B 7/02 |
| | | | | | | 494/12 |

(Continued)

*Primary Examiner* — Lloyd A Gall
(74) *Attorney, Agent, or Firm* — Wang Law Firm, Inc.

(57) ABSTRACT

An apparatus, which is connected to a bicycle, includes a case having a chamber, a main device received in the chamber of the case, a locking member connected to the main device, a lid connected to the case to seal the chamber, wherein the lid has a bore and the bore is received in the chamber of the case, and a transceiver received in the chamber of the case and electrically connected to the locking member, wherein the transceiver receives a signal to control the locking member accordingly. The apparatus can be opened by the outside signal transmitted to the transceiver only.

7 Claims, 8 Drawing Sheets

(56) References Cited

U.S. PATENT DOCUMENTS

2019/0300082 A1\* 10/2019 Shen ........................ B62H 5/02

\* cited by examiner

APPARATUS WITH HIGH SECURITY FOR BICYCLE

BACKGROUND OF THE INVENTION

1. Technical Field

The present invention relates to a bicycle, and more particularly to an apparatus with high security for a bicycle.

2. Description of Related Art

A conventional bicycle rental system provides a plurality of rental bicycles, each of which is provided with a bicycle lock, so that the rental bicycles can be rented and returned anywhere.

A conventional bicycle lock includes a box, a locking apparatus received in the box, and a lid secured to an opening of the box. The box is fixed to the rental bicycle by bolts or the equivalent device. As a result, the locking apparatus is safely hidden in the box, and the rental bicycle is able to be rented and returned anywhere by operating the locking apparatus to lock or unlock the rental bicycle.

The conventional bicycle lock is easy to be damaged by breaking the bolts or breaking the box or the lid. Therefore, one may ride the rental bicycle by breaking the bicycle lock instead of by the rental process.

It usually has a power source in the box as well, and the power source may be stolen by breaking the bolts or breaking the box or the lid as described above.

In conclusion, the security of the conventional bicycle lock is very weak, and it needs to be improved.

BRIEF SUMMARY OF THE INVENTION

In view of the above, the primary objective of the present invention is to provide an apparatus with high security for a bicycle, which overcomes the problem of the conventional apparatus connected to the bicycle as described above.

The secondary objective of the present invention is to provide an apparatus with high security for a bicycle, which has high security In order to achieve the objective of the present invention, an apparatus, which is connected to a bicycle, includes a case having a chamber in an axial direction; a main device received in the chamber of the case; a locking member connected to the main device; a lid connected to the case to seal the chamber, wherein the lid has a bore and the bore is received in the chamber of the case; and a transceiver received in the chamber of the case and electrically connected to the locking member, wherein the transceiver receives a signal to control the locking member accordingly.

The locking member engages the bore of the lid to secure the case, the main device, and the lid together in a normal condition, and the locking member disengages the bore of the lid when the transceiver receives an unlock signal, so that the main device and the lid are able to be separated from the case.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
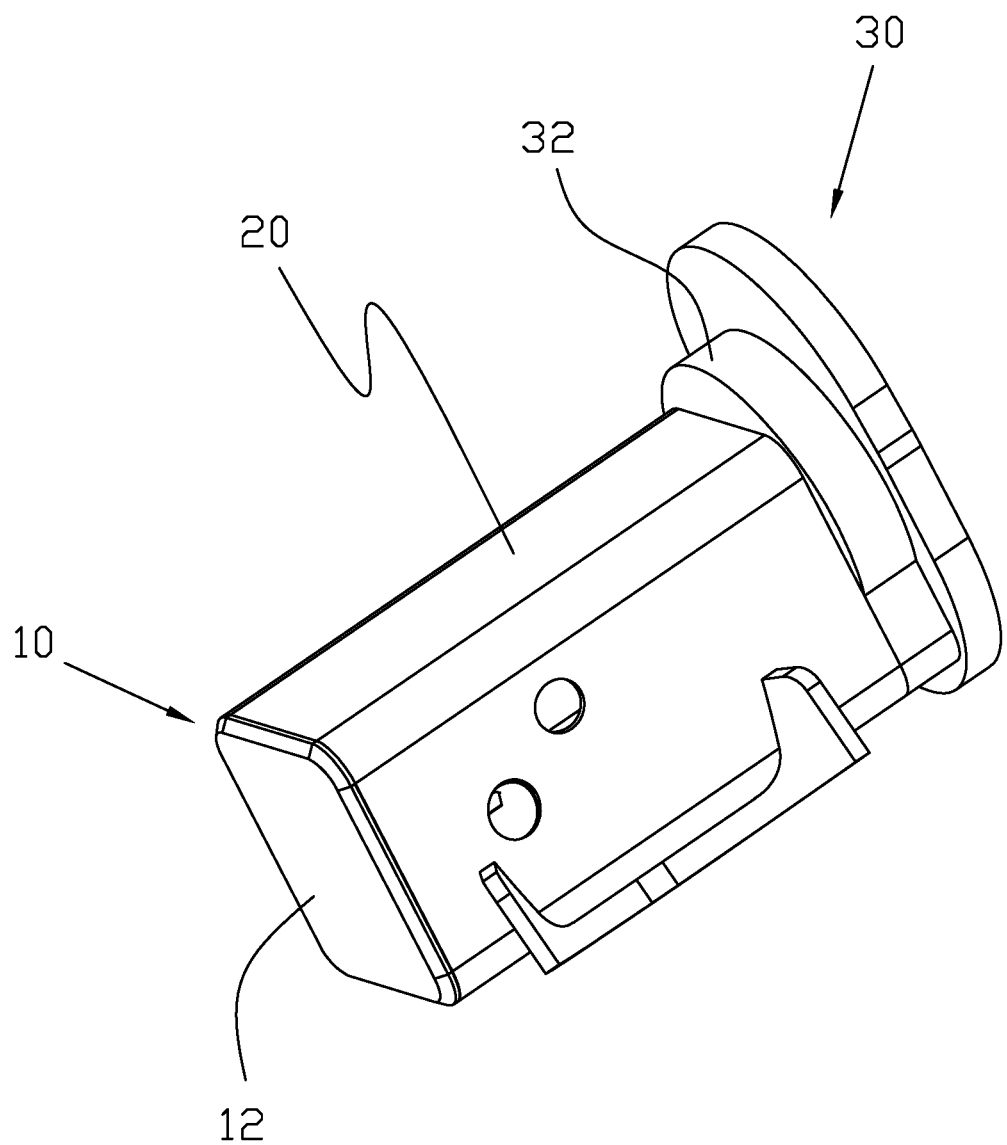
FIG. 1 is a perspective view of a first preferred embodiment of the present invention.
Figure 2:
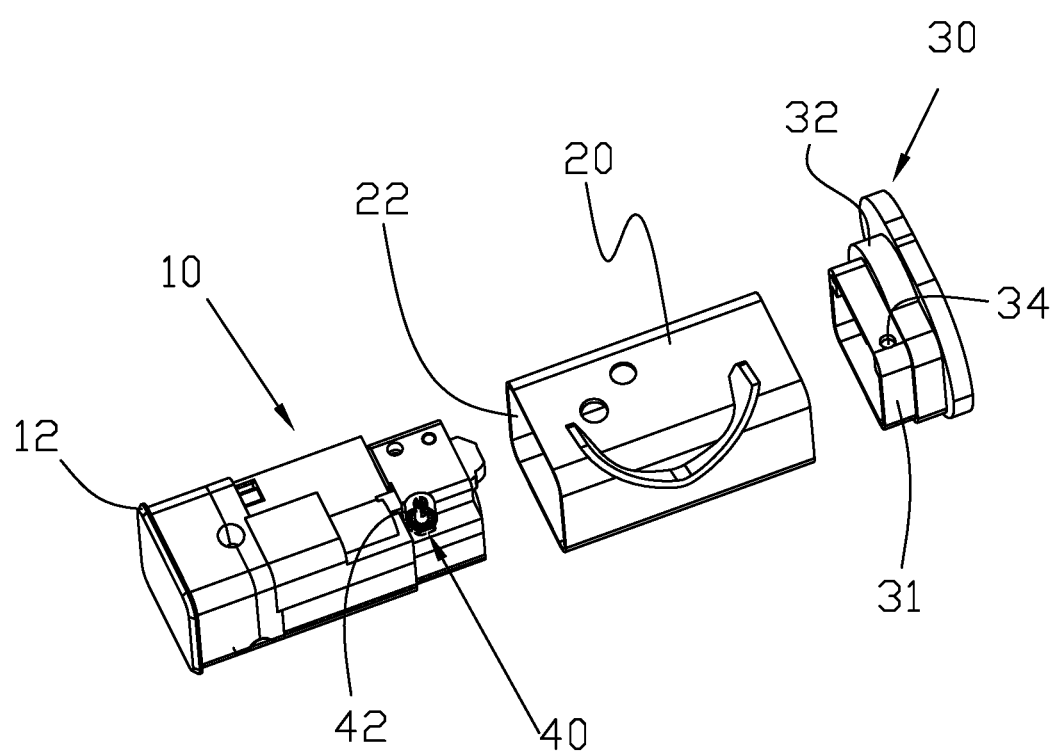
FIG. 2 is an exploded view of the first preferred embodiment of the present invention.

FIG. 1 and FIG. 2 show an apparatus to be secured to a bicycle. The apparatus may be a locking apparatus or a power source apparatus. The apparatus includes a main device 10, a case 20, and a lid 30. The main device 10 has a stop portion 12 at an end thereof. The case 20 has a chamber 22 in an axial direction (see FIG. 2). The lid 30 has a protrusion 31 and a lid stop portion 32.

The main device 10 is received in the chamber 22 of the case 20 with the stop portion 12 against an end of the case 20, and the lid 30 engages a protrusion 31 with the chamber 22 of the case 20 via the other end with the lid stop portion 32 against the other end of the case 20. As a result, the main device 10 is received in the case 20, and the stop portion 12 of the main device 10 and the lid stop portion 32 of the lid 30 are located at the opposite ends of the case 20.

As shown in FIG. 2, a locking member 40, which is provided on the main device 10, has a movable shaft 42 extending in an axial direction. The locking member 40 is an electromechanical device, such as a solenoid valve. The lid 30 has a bore 34 on the protrusion 31.

Figure 3:
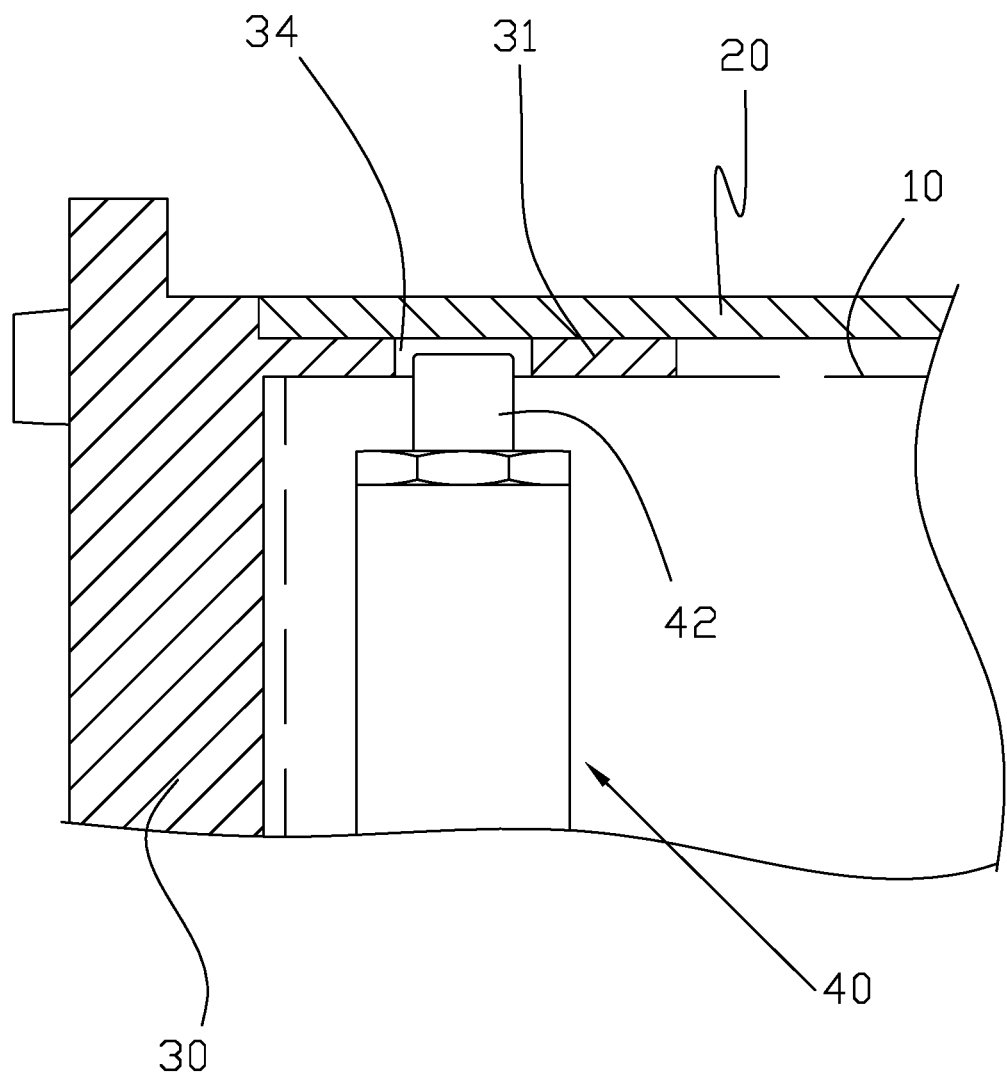
FIG. 3 is a sectional view of the first preferred embodiment of the present invention, showing the locking status.

As shown in FIG. 3, in the combination of the main device 10, the case 20, and the lid 30, the movable shaft 42 of the locking member 40 is aligned with the bore 34 of the lid 30, and the protrusion 31 and the bore 34 are hidden in the case 20.

Figure 4:
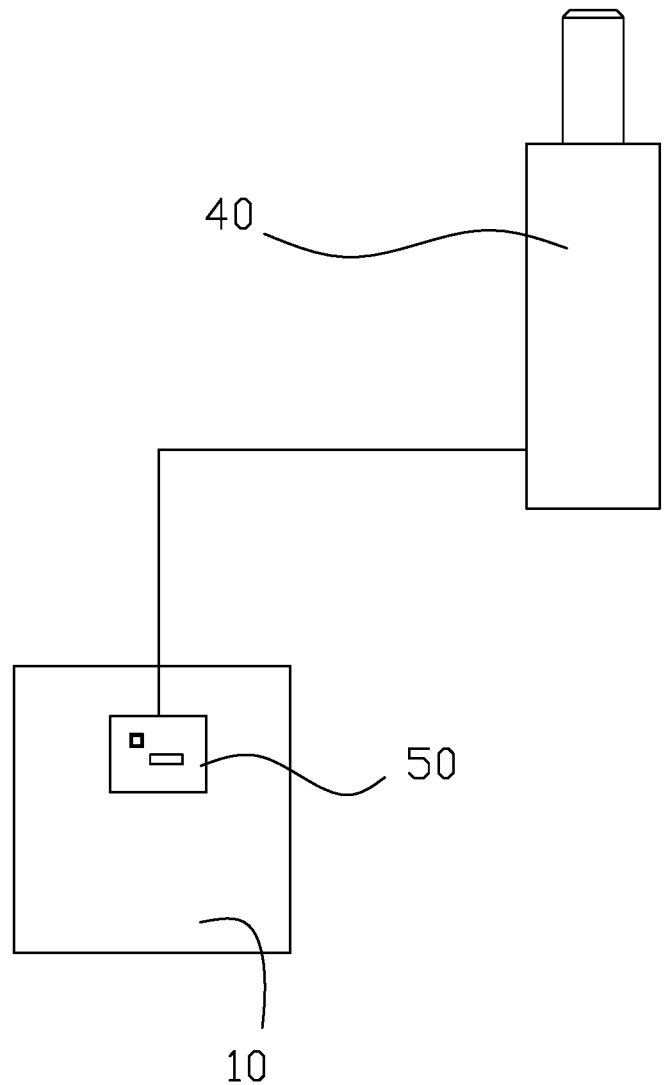
FIG. 4 is a sketch diagram of the first preferred embodiment of the present invention, showing the transceiver and the locking member.

As shown in FIG. 4, the apparatus of the first preferred embodiment further includes a transceiver 50 mounted on the main device 10 and electrically connected to the locking member 40. The transceiver 50 may receive an unlock signal from outside to control the locking member 40 accordingly.

As shown in FIG. 3, in a normal condition, and the locking member 40 moves the movable shaft 42 outwards to engage the bore 34 of the lid 30. As a result, the main device 10, the case 20 and the lid 30 are firmly secured together normally.

Figure 5:
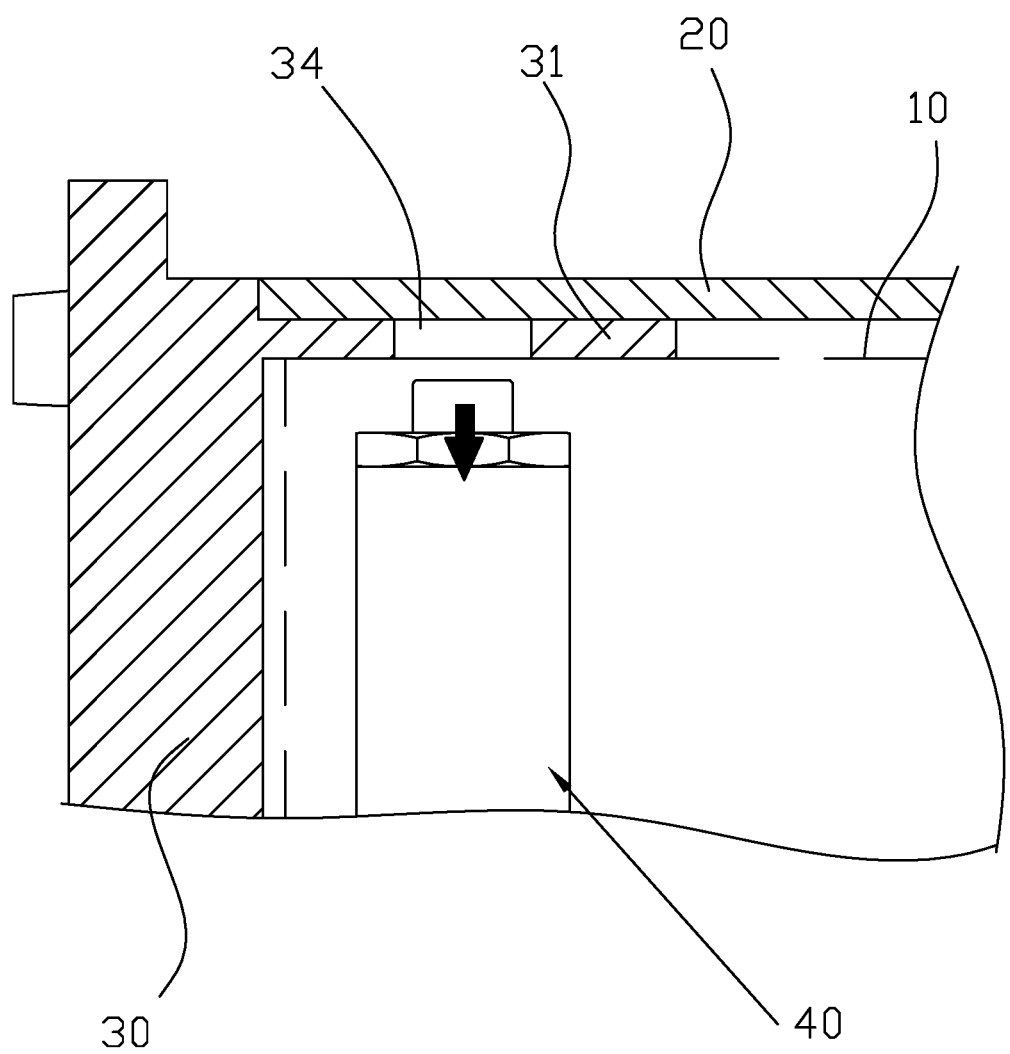
FIG. 5 is a sectional view of the first preferred embodiment of the present invention, showing the unlocking status.

As shown in FIG. 5 and FIG. 4, the transceiver 50 transmits a control signal to the locking member 40, and the locking member 40 moves the movable shaft 42 inwards to disengage the bore 34 of the lid 30 when the transceiver 50 receives the unlock signal. As a result, the main device 10 and the lid 30 may be separated from the case 20.

Figure 6:
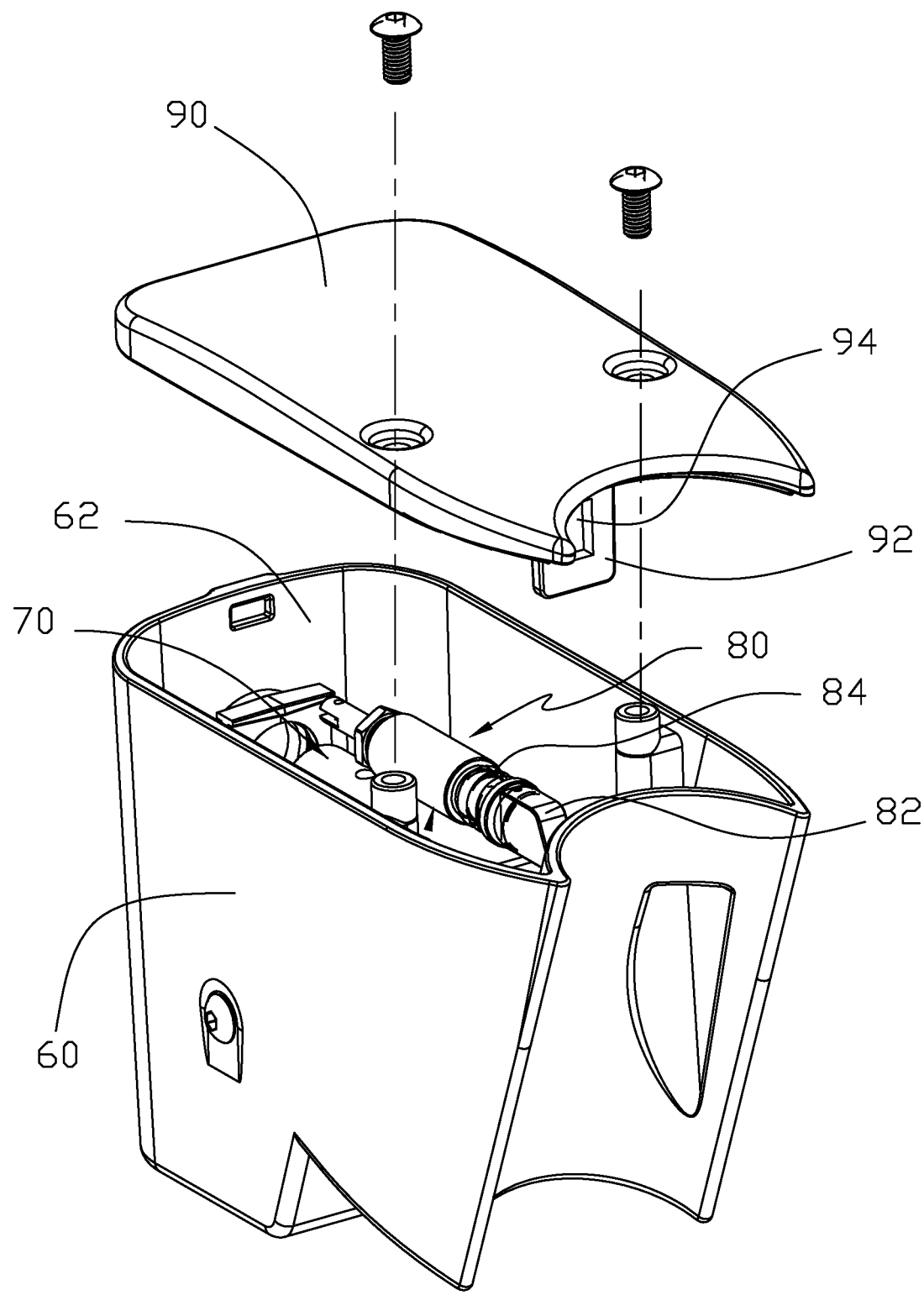
FIG. 6 is an exploded view of a second preferred embodiment of the present invention.
Figure 7:
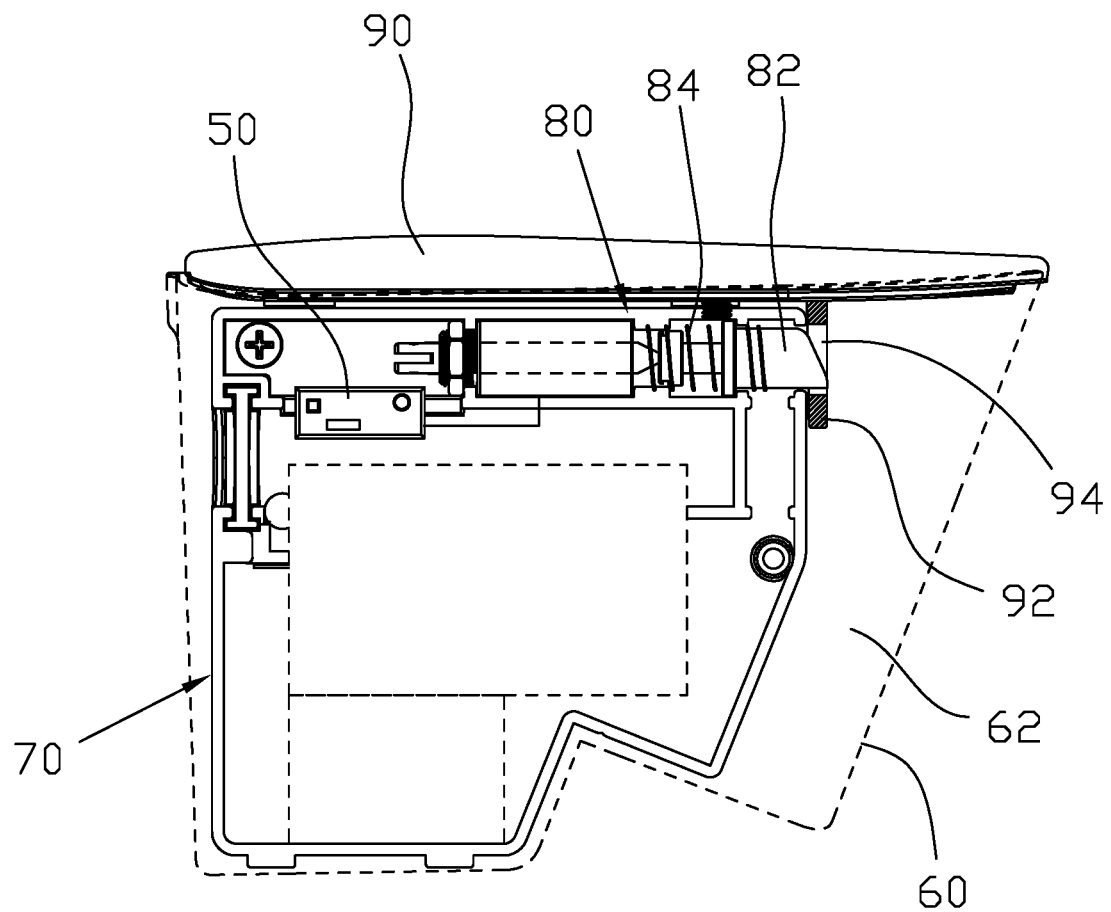
FIG. 7 is a sketch diagram of the second preferred embodiment of the present invention, showing the locking status.

As shown in FIG. 6 and FIG. 7, an apparatus of the second preferred embodiment of the present invention includes a case 60, a main device 70, a locking member 80, and a lid 90. The case 60 is a box-like member, having a chamber 62 therein, and the main device 70 is received and fixed in the chamber 62 of the case 60. The locking member 80 is mounted on the main device 70, and the lid 90 is connected to the case 60 to seal the chamber 62.

The locking member 80 has a movable latch 82 and a spring 84 urging the latch 82. The lid 90 has a board 92, on which a bore 94 is provided. The latch 82 is aligned with the bore 94.

In the combination of the case 60, the main device 70, and the lid 90, the board 92 of the lid 90 is received in the chamber 62 of the case 60, and the latch 82 is urged by the spring 84 to engage the bore 94 of the lid 90 in a normal condition. The transceiver 50 is provided as well in the second preferred embodiment to control the locking member 80 as described above.

In the normal condition, the spring 84 urges the latch 82 to engage the bore 94 of the lid 90, so that the case 60, the main device 70, and the lid 90 are firmly secured together.

Figure 8:
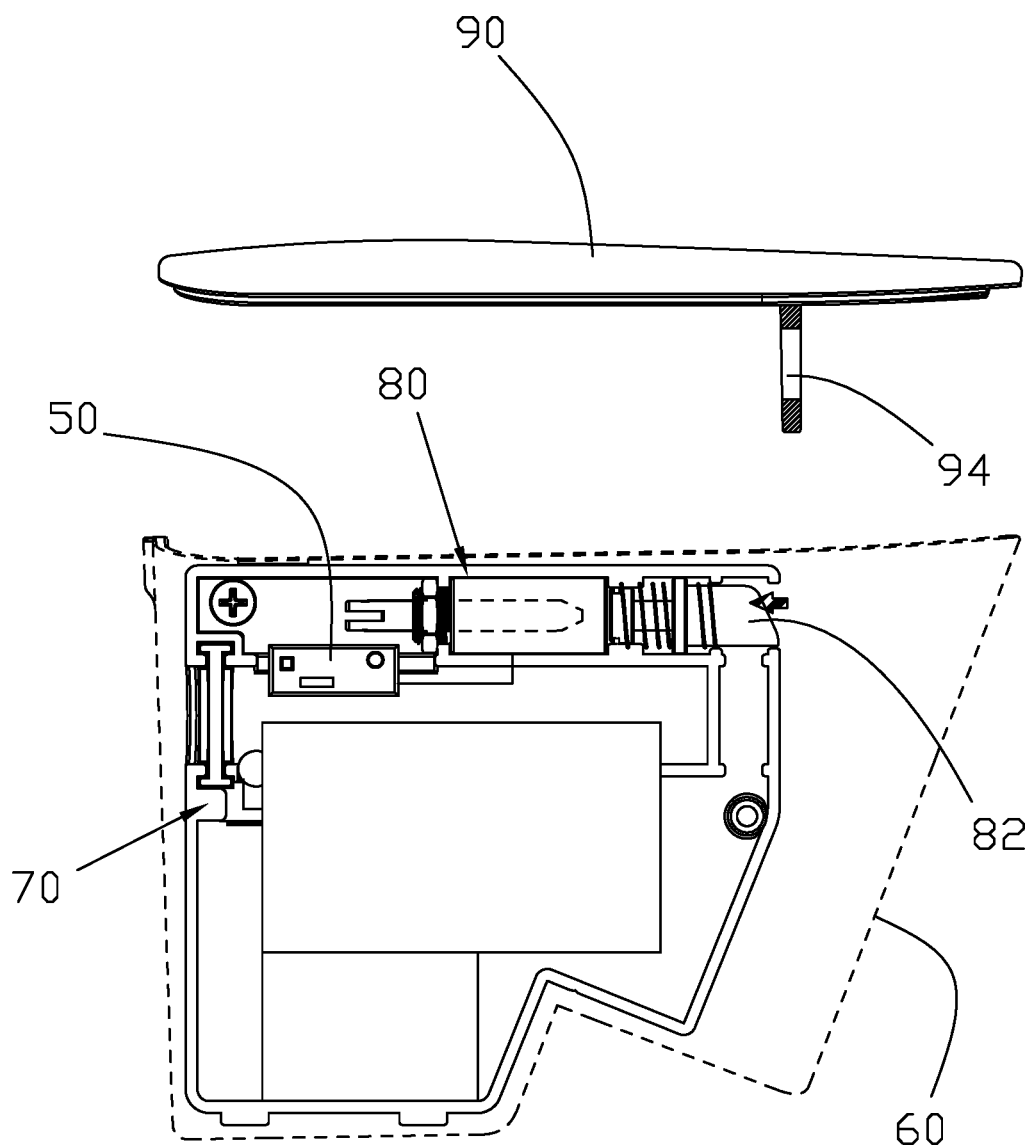
FIG. 8 is a sketch diagram of the second preferred embodiment of the present invention, showing the unlocking status.

As shown in FIG. 8, when the transceiver 50 receives an unlock signal, the transceiver 50 transmits a control signal to the locking member 80, and the locking member 80 moves the latch 82 to disengage the bore 94 of the lid 90 and bias the spring 84, so that the main device 70 and the lid 90 are able to be separated from the case 60.

In conclusion, the main device 10, 70 and the lid 30, 90 are secured by engagement of the locking member 40, 80 and the bore 34, 94 of the lid 30, 90. Since the locking member 40, 80 and the bore 34, 94 of the lid 30, 90 are hidden in the case 20, 60, the locking member 40, 80 is controlled by an outside signal only. Therefore, even if the bolts, which secure the apparatus to the bicycle, are damaged, the lid 30, 90 still is secured to the case 20, 60, and the main device 10, 70 is safely received in the case 20, 60. The main device 10, 70 may be a locking device or a power source.

It must be pointed out that the embodiments described above are only some preferred embodiments of the present invention. All equivalent structures which employ the concepts disclosed in this specification and the appended claims should fall within the scope of the present invention.

What is claimed is:

1. An apparatus, which is connected to a bicycle, comprising:
    a case having a chamber in an axial direction;
    a main device received in the chamber of the case;
    a locking member connected to the main device;
    a lid connected to the case to seal the chamber, wherein the lid has a bore and the bore is received in the chamber of the case; and
    a transceiver received in the chamber of the case and electrically connected to the locking member, wherein the transceiver receives a signal to control the locking member accordingly;
    wherein the locking member engages the bore of the lid to secure the case, the main device, and the lid together in a normal condition, and the locking member disengages the bore of the lid when the transceiver receives an unlock signal, so that the main device and the lid are able to be separated from the case;
    wherein the transceiver receives a wireless signal to transmit a control signal to the locking member, and the locking member is moved accordingly to engage or disengage the bore of the lid.

2. The apparatus of claim 1, wherein the locking member has a movable shaft; the lid has a protrusion received in the chamber of the case, and the bore is provided on the protrusion.

3. The apparatus of claim 1, wherein the main device has a stop portion against an end of the case when the main device is received in the chamber of the case, and the lid has a lid stop portion against an opposite end of the case when the lid is connected to the case.

4. The apparatus of claim 2, wherein the main device has a stop portion against an end of the case when the main device is received in the chamber of the case; the lid has a lid stop portion and a protrusion connected to the lid stop portion; the lid stop portion of the lid abuts against an opposite end of the case and the protrusion, on which the bore is provided, is received in the chamber of the case when the lid is connected to the case.

5. The apparatus of claim 1, wherein the locking member has a movable latch, and the lid has a board, on which the bore is provided; the board is received in the chamber of the case when the lid is connected to the case, and the latch is controlled to engage and disengage the bore.

6. The apparatus of claim 5, wherein the locking member further has a spring urging the latch to engage the bore of the lid in the normal condition.

7. The apparatus of claim 1, wherein the case has a tubular member, having the chamber therein; the main device is inserted into the chamber of the case via an end thereof, and has a stop portion against the end of the case; the lid is inserted into the chamber of the case via an opposite end thereof, and has a lid stop portion against the opposite end of the case; the locking member is received in the chamber of the case and associated with the bore of the lid.

* * * * *